United States Patent Office 3,759,691
Patented Sept. 18, 1973

3,759,691
METHOD FOR PRODUCING INTERMETALLIC CONNECTIONS
Rozica Loitzl, Wettingen, and Claus Schueler, Widen, Switzerland, assignors to Brown Boveri & Company Limited, Baden, Switzerland
No Drawing. Filed Sept. 15, 1971, Ser. No. 180,862
Claims priority, application Switzerland, Sept. 23, 1970, 14,056/70
Int. Cl. H01f 1/06, 1/08
U.S. Cl. 75—.5 BA                             5 Claims

ABSTRACT OF THE DISCLOSURE

Metal compounds are produced by reacting the initially solid phase metal components, preferably in the form of relatively coarse, intermixed granules, in the presence of a transport substance, such as a halogen, in a sealed system, whereby the reaction temperature and/or the reaction pressure as well as the stoichiometric ratios of the components participating in the reaction are selected so that the resulting compound assumes its most stable thermodynamic state at said reaction temperature and/or reaction pressure.

BACKGROUND OF THE INVENTION

The invention relates to a method for producing intermetallic compounds. More particularly, the invention relates to methods in which the starting metal components which are to react with each other, are heated in the presence of a transport substance which forms a volatile compound at the reaction temperature with at least one of the metals.

It is known to produce intermetallic compounds by melting the components at the appropriate mol ratio. This method of production, however, gives rise to difficulties if the respective compound solidifies in an incongruent manner. A single phase compound may then be obtained only in those cases in which an adequate solid diffusion of the components is possible by way of a thermal treatment of the multi-phase melt below the melting point.

It is also known to produce certain modifications of the crystalline structure of a given intermetallic compound by a thermal treatment of the modification of a higher temperature stage, whereby said thermal treatment takes place below the transformation temperature. Here again, quite frequently a solids diffusion is the controlling mechanism for bringing about the reaction. Hence, this method cannot be employed, if the transformation temperature is so low that the diffusion rate is insufficient at the particular treatment temperature.

It is also known to produce intermetallic compounds by sintering, in particular pressure sintering. The starting components for the sintering process are in powder form and have a very small particle size. The powder mixture is reacted at the highest possible temperature and at the highest possible pressure but below the melting point of the resulting compound. In sintering the reaction rate is also determined by the solids diffusion which is impeded by oxide, nitride, and other film surfaces which occur in quantitatively substantial or relatively large values in fine powders due to the large total available surface. Moreover, such films introduce undesirable impurities into the sintered metal.

In order to avoid the just mentioned difficulties which occur in connection with the solids diffusion, in particular in order to achieve a reaction at relatively low temperatures, and for growing single crystals, it is known to transport the material by a diffusion in the gas phase whereby the diffusion rate is substantially higher than in the solids diffusion. For example, "J. Phys. Chem. Solids 21 (1961), pp. 199–205" or "J. Phys. Chem. Solids 17 (1960), pp. 163–165" discloses the growing of chalkogenide single crystals by converting the substance of which the single crystal is to be grown, into the gas phase by reaction with a transport substance at a first temperature and then precipitating the substance from the gas phase at a second, lower temperature whereby a single crystal is formed. It is also known from H. Schaefer, "Chem. Transportreaktionen," published by Verlag Chemie GmbH, Weinheim/Bergstrasse, Germany, 1st edition, pp. 108–110 to produce a metal chalkogenide, namely niobium monoxide, by reacting a mixture of niobium and pentoxide powder at a temperature of 900° C. with the addition of hydrogen, chlorine or iodine.

In the aforementioned reactions it is notable that very small quantities of a transport substance are sufficient for conveying practically unlimited amounts of materials which are to be reacted since the precipitation or deposition of the final product is always accompanied by the liberation of transport substance which is then once again able to diffuse to the starting material for transporting the latter.

German patent publication 1,458,474 discloses in connection with the production of intermetallic, superconductive compounds, to transform pre-sintered starting material comprising the components to be reacted, into the gas phase by transferring bromine or iodine in an inert carrier gas stream and by heating, the final product is then precipitated downstream by reduction of the bromide or iodine with hydrogen. However, the stoichiometric conditions of the final product cannot be accurately predefined by this known method, a fact which cannot be tolerated for many applications of the resulting product. Moreover, the technical effort required for performing this known method is rather substantial.

Transport reaction of the kind mentioned above have not yet been employed for the synthesis of intermetallic compounds although the production of such compounds, especially the production of a specific compound modification is very significant for the production, for example, of permanent magnets, semi-conductors or super-conductors. A reason for this may probably be the fact that the intermetallic compound obtained by way of these reactions, comprises a plurality of stoichiometric conditions and phases which are closely adjacent to each other in thermodynamic, energetic terms. Accordingly, it was to be expected that after completion of the reaction a polyphase mixture of heterogeneous stoichiometric configuration would result instead of the desired compound.

OBJECTS OF THE INVENTION

In view of the foregoing it is the aim of this invention to achieve the following objects singly or in combination:

To overcome the drawbacks of the prior art as set forth above;

To provide a method of producing metal compounds from a plurality of metal components which employs transport techniques and nevertheless results in compounds of predictable stoichiometric ratios and predictable or rather preselectable characteristics;

To produce such compounds during desirably short reaction periods whereby advantageously large quantities of the desired compound should be produced during said short reaction periods;

To assure that the resulting compound has the necessary purity as well as a preselectable or optional composition;

To provide a method for producing metal compounds which have a predeterminable or preselectable crystalline structure or so called modification, and To employ transport techniques in the production of metal compounds whereby the transport substance is to be used repeatedly so to speak in a recycling fashion.

SUMMARY OF THE INVENTION

The invention teaches that the solid phase metal components to be reacted with each other are heated together with a transport substance in an enclosed or sealed system wherein the stoichiometric ratio of the components reacting with each other, the reaction temperature and/or the reaction pressure are selected so that the resulting compound is in its most stable thermodynamic state for the selected values which influence the reaction.

Preferably, said transport substance, such as a halogen, forms volatile compounds at the reaction temperature with all metal components. The equilibrium constant of the reaction system is such that the reaction of the volatile compound of a first metal with a second metal is possible and accompanied by the liberation of the first metal and so that the reaction of the volatile compound of the second metal with the first metal is also possible and accompanied by the liberation of the second metal.

The reaction according to the invention is normally performed at a uniform temperature without a temperature gradient. The success of the method according to the invention is due to the fact that the transport substance, for example a halogen or halide forms a compound with the metal components which are to be reacted, said compound having a very substantial vapour pressure, for example greater than $10^{-6}$ torr, far below the melting points of the metals so that the reaction for forming the desired intermetallic compound is no longer determined by a solids diffusion but by the dffusion in the gas phase. The fact that a predetermined intermetallic compound is exclusively obtained after the completion of the reaction is due to the finding that said intermetallic compound in its stoichiometric composition of a defined modification has a minimum of free energy under the selected reaction conditions. Thus, all other compounds and modifications which may occur during the reaction are therefore finally decomposed in favour of the desired compound.

A good transformation is obtained according to the invention even if one metal-transport substance compound is volatile while the other is merely liquid at the selected reaction temperature. The important feature here resides in the fact that the final compound is not produced through a solids reaction.

DESCRIPTION OF EXAMPLE EMBODIMENTS

In order that the invention may be clearly understood, it will now be described by way of example, with reference to a general example and five specific examples.

Example 1 (General example)

The binary intermetallic compound AB is to be synthesised from the starting metal components A+B, thus:

$$A+B \rightarrow AB \qquad (1)$$

To this end, the components A and B preferably in the form of relatively coarse granules having a particle diameter of about 0.1 to 1.0 mm., are mixed with each other and the mixture is then placed into a suitable enclosure such as a reaction vessel having a small reaction volume, for example 20 to 30 cm.³. This enclosure is then evacuated. Thereafter a small quantity of transport substance, for example the halogen, is introduced into the vessel or enclosure which is then sealed in a vacuum-tight manner. The vessel is then heated to and maintained at the reaction temperature for a suitable period of time which may amount to several hours or days.

The transport substance X will then form with the metals A and B the compounds $AX_n$ and $BX_m$ which become volatile under the reaction conditions due to their high vapour pressure. The reaction system may be expressed by the equation:

$$(m)AX_n + (n)B \rightleftharpoons (m)A + (n)BX_m \qquad (2)$$

Such a reaction system (2) has an equilibrium reaction constant $K_{(2)}$ which must be such that a reaction in both directions is possible, thus:

$$K_{(2)} = \frac{[AX_n]^m \cdot [B]^n}{[A]^m \cdot [BX_m]^n} \neq 0 \text{ or } \infty \qquad (3)$$

Therefore, the value of $K_{(2)}$ should preferably not differ too widely from unity. A too widely differing value of $K_{(2)}$ would suppress one of the two reaction directions in Equation 2. The forward as well as the reverse reaction should take place to a sufficient degree. Suitable values for $K_{(2)}$ may be obtained by an appropriate selection of the reaction temperature and/or of the transport medium X. However, it has been found that values which deviate substantially from unity may also be suitable if the reaction speed is disregarded. Thus, $K_{(2)}$ values in the range of $10^{-6}$ to $10^6$ may be regarded as perfectly suitable. Under the just mentioned conditions the atoms of the components A and B are conveyed to and fro in a statistical manner between the particles of the starting mixture. The compound AB will be formed if A and B meet at one location because the compound has a lower free energy than the separate components thereof. The reaction is accomplished by the liberation of transport substance and subsequently A and B solid phase components are again dissolved so that the reaction may be repeated. Thus, on average an increasing quantity of the compound AB will be formed in time until the components have been completely reacted to form the compound.

The metal atoms A and B which diffuse freely in the gas phase coincide statistically not only in the mol ratio of the desired compound but also in other mol ratios whereby compounds of various stoichiometric compositions and modifications or crystalline structure are formed. However, at the given reaction temperature and, where appropriate, at the reaction presure only one intermetallic compound of a defined stoichiometric composition and modification will be thermodynamically stable, namely the compound which under the given conditions or reaction influencing values will have the smallest amount of free energy. As the reaction time progresses, this compound is present in an increasing quantity at the expense of the other intermediately formed compounds and at the end of the reaction it alone will be present.

Large crystals are energetically more advantageous than small crystals due to the ratio of surface area to volume. Hence, the small crystallites are finally dissolved in favour of the larger crystal (mineralisator effect) and the resulting product will usually be in a rather coarse crystalline form, if the reaction times are sufficiently long whereby the particle sizes vary between 0.1 and 1.0 mm. depending on the reaction time.

The reaction space or volume is preferably small. This increases the probability of the reaction as expressed in Equation 1 above. Since the free length of travel of the substances diffusing and reacting in the gas phase depends on the ambient pressure, it is also possible to add an inert gas to the reaction mixture for suitably adjusting the reaction pressure.

The main advantage of the method according to the invention is seen in the fact that due to the rapid diffusion in the gas phase combined with a reaction of the type illustrated by Equation 2 the thermodynamic equilibrium of the final reaction of Equation 1 is reached within a relatively short period of time. To this end it is necessary that the temperature is merely as high as is necessary to assure the forward and reverse reaction of Equation 2. Stated differently the equilibrium reaction constant $K_{(2)}$ must not, as mentioned above deviate from unity to the extent that one of the two reaction directions is completely suppressed. The decisive feature is seen in that according to the method of the invention the thermodynamically fixed end state of the reaction is actually achieved, in a kinetic sense, within a useful period of time. Such end state is defined by the respective phase diagram.

Example 2

It is required to synthesize $FeSi_2$, namely the phase which is stable only below 920° C. This phase known as $\beta\text{-}FeSi_2$, is a semiconductor and is preferred for the thermoelectric energy conversion. The high temperature phase of $FeSi_2$ is metallic. Hitherto, $\beta\text{-}FeSi_2$ has been produced, for example, through powder metallurgy in a multi-step method.

Fine iron filings having a diameter of approximately 1.0 mm. and Si granules having a diameter of approximately 1.0 mm. are mixed at the ratio of 1 mol Fe and 2 mol Si to obtain a total weight of 4.0 grams. This mixture and 39.7 mg. of Fe plus 180.3 mg. of $I_2$ (for each 0.73 mmol) are placed in an enclosure such as a quartz glass ampulla having a volume of 25 cm.$^3$. After evacuation to $10^{-4}$ torr, the ampulla is closed by fusing it in a vacuum-tight manner whereupon it is heated for several days to a temperature $T_R=880$ to 900° C. Periodically varying the temperature within the specified limits for a period or duration of approximately 20 minutes and an occasional shaking of the ampulla facilitates the reaction. Finally, the transport substance $FeI_2$ is condensed on the wall by cooling one side of the ampulla. $FeI_2$ is thermodynamically more stable than the iodine of silicon, which is also produced. An appropriate excess of Fe was added so that the iodine of silicon remains at the end of the reaction when it may be separated.

The ampulla is opened after complete cooling. The reaction product comprises crystalline, semiconductive $\beta\text{-}FeSi_2$. When the reaction time is relatively long, the crystallite size varies between 0.1 and 1.0 mm. Doping substances such as Al for p-conductive material and Co for n-conductive material may be added to the initial components and will thus be incorporated into the $\beta\text{-}FeSi_2$.

All possible phases and stoichiometric ratios of the binary system Fe/Si may be formed statistically as intermediate products during the reaction, for example FeSi, $Fe_3Si$, $\alpha\text{-}Fe\text{-}Si_2$ etc. but, as the reaction progresses, they are dissolved again in favour of the sole low-temperature phase $\beta\text{-}FeSi_2$ which is semiconductive at 900° C. and is stable with the stoichiometric ratio Fe+2Si, so that this will be the sole remaining phase. This is so because at this point of the phase diagram, $\beta\text{-}FeSi_2$ has the smallest amount of free energy.

Example 3

The following were synthesised in an analogous manner:

FeSi at $T_R=920$–950° C.
CoGe at $T_R=800$–880° C.
CoSi at $T_R=800$–880° C.
CrGe at $T_R=870$–800° C.

The transport substance was in all cases $I_2$.

Example 4

$V_3Si$ is to be produced. This compound is a super-conductor with a high transition point at $T_c=17°$ K. It melts in an incongruent manner at approximately 1700–2000° C.

Three grams of a mixture comprising 3 mol of vanadium (V) and 1 mol of Si having a particle size of approximately 0.5 mm. are placed together with 23.6 mg. of V+176.4 mg. of $I_2$ into a reaction vessel of molybdenum. The vessel is loosely closed and introduced into a quartz vessel, both being evacuated together, and the quartz vessel is closed by fusing in vacuum-tight manner. The reaction is continued for several days at a temperature of 1000–1150° C. The quartz vessel is then opened after cooling. The molybdenum vessel contains $V_3Si$ and $VI_3$ the latter is then removed by washing with alcohol. The already mentioned excess vanadium was added for the same reasons as stated in Example 2, namely to assure that the respective iodine remains at the end for removal.

Example 5

The production of $Co_5Pr$ is described as an example for the synthesis of the important $Co_5RE$ compounds (RE: rare earth metals). This compound is a material for making permanent magnets and is preferably required in pulverized form.

A quantity of 2.95 g. of cobalt and 1.41 g. of praseodymium in the form of a powder or of fine filings is introduced into a molybdenum vessel together with 0.2 g. of $PrI_3$, which is then sealed tight by welding under vacuum. To this end, $PrI_3$ is introduced in the form of its elements, namely 0.054 g. of praseodymium and 0.146 g. of iodine.

The sealed molybdenum vessel is fused into an evacuated quartz vessel. Both vessels are placed into a furnace and are heated to 950–1150° C. After a period of time, amounting to between 10 and 100 hours depending on the fine particle size of the weighed material, the reaction

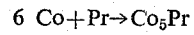

$$6\ Co+Pr \rightarrow Co_5Pr$$

will be completed. The cooled vessels are opened and the $Co_5Pr$ powder is freed of adhering $PrI_3$ by washing with alcohol or water. The process will be performed more rapidly and more uniformly if the powder is mechanically agitated during the reaction, for example by shaking or rotating the vessels slowly about their longitudinal axis. Moreover, such agitation produces the very fine powders which are best suitable for producing permanent magnets.

Example 6

This method is especially suitable for larger reaction quantities. This may be illustrated by the production of $Co_5Sm$ powder for fine particle permanent magnets.

A quantity of 11.76 g. of cobalt and 7.20 g. of samarium in the form of lumps, chips or powder is weighed and introduced into a tantalum ampulla having a length of 100 mm. and a diameter of 20 mm., corresponding to a volume of 31.5 cm.$^3$. To this is added 0.22 g. of iodine as the transport substance. The excess of samarium above the stoichiometric ratio of 5:1 of the end product $Co_5Sm$ amounts to approximately 20% for the purpose of combining with the iodines which are to be precipitated at the end of the reaction and to compensate for entrained, oxygen-bearing impurities of the starting material and for reacting with the wall of the vessel.

The tantalum ampulla is then closed by welding under vacuum and is fused under vacuum into a quartz ampulla. The quartz ampulla is then rotated in a furnace at a temperature of approximately 850° C. at a speed of approximately 100 rotations per minute, whereby partially through thermodynamically instable intermediate phases, a reaction forming $Co_5Sm$ takes place due to an isothermal gas transport. The lower the selected reaction temperature is the longer will be the duration of the reaction. The reaction and the material for example the vessel walls with which the reaction components, in particular iodine, come into contact will define the lower temperature limit. The reaction is performed for several hours or days, for example 24 hours, after which the ampulla is cooled and opened under ethanol.

ADVANTAGES OF THE INVENTION

The advantages of the method according to the invention may be summarized as follows. The compound is produced at a relatively low temperature. Compounds which melt in an incongruent manner and low temperature phases can thus be directly synthesised.

The reaction speed does not substantially depend on a solids diffusion. The reaction proceeds completely within a useful time period even if the initial material is only coarsely divided. Impurities which otherwise may be introduced by the surface of finely diveded powders, for example in sintering, do not occur in practicing the invention.

The reaction product is obtained as a well crystallized material having a particle size of 0.1–1.0 mm., depending on the reaction time. The surface comprises substantially clean crystal faces whereby further processing, for example pressing, extruding, embedding in plastics and the like is greatly facilitated.

The thermodynamically most stable state is always assumed for any stoichiometric ratio of the initial components. Systematic variation of the initial material weighed thus provides a method for discovering phases of intermediate compounds for defined temperatures and, if desired, pressures.

The method according to the invention may also be employed for the production of intermetallic compounds having more than two components and/or extended homogeniety zones. The composition of the end product will be defined by the initially weighed material. Transport substances other than halides, for example Co, for the transport of Ni through nickel carbonyl or $O_2$ for the transport of Pt may also be used. The temperature of the reaction mixture may be "rocked," that is to say it is possible to produce local temperature gradients in the reaction vessel in order to facilitate the reaction.

In view of the foregoing it is to be noted, that it is intended to cover all modifications and equivalents within the scope of the appended claims.

What is claimed is:

1. A method for producing a permanent magnetic material of cobalt and at least one rare earth metal, comprising the steps of: placing said cobalt and rare earth metal in solid phase as starting metal components and a halogen as a reaction mixture in a reaction enclosure, sealing said enclosure against the atmosphere to form a closed system, heating said system to a reaction temperature at which said halogen forms a volatile compound with each of said starting metal components and cooling said system for recovering said magnetic material as a final product.

2. The method of claim 1, comprising selecting as reaction influencing conditions the stoichiometric ratio of the starting components to be reacted, the reaction temperature and the pressure in the reaction enclosure, whereby said final product has its thermodynamically most stable state.

3. The method of claim 2, wherein the starting metal components are initially charged in said enclosure in a ratio differing from the stoichiometric ratio of the final product, the excess of at least one of the components being provided for combining with halogen to be precipitated out at the end of the reaction, to compensate for entrained oxygen impurities of the starting components, and to react with the wall of said enclosure.

4. The method of claim 1, wherein said halogen is iodine.

5. The method of claim 1, further comprising agitating the reaction components during the reaction time in said enclosure.

References Cited
UNITED STATES PATENTS 3,535,103   10/1970   Whitfied   75—0.5 B
3,425,825   2/1969    Wilhelm    75—0.5 B WAYLAND W. STALLARD, Primary Examiner U.S. Cl. X.R.

148—101, 105